US005577907A

United States Patent [19]
Linnér

[11] Patent Number: 5,577,907
[45] Date of Patent: Nov. 26, 1996

[54] HOT GAS HEATING DEVICE

[75] Inventor: Hans Linnér, Kalmar, Sweden

[73] Assignee: Norden Pac Development AB, Sweden

[21] Appl. No.: 336,791

[22] Filed: Nov. 9, 1994

Related U.S. Application Data

[63] Continuation of Ser. No. 204,177, filed as PCT/SE92/00598, Jan. 9, 1992 published as WO93/04844, Mar. 18, 1993, abandoned.

[30] Foreign Application Priority Data

Sep. 4, 1991 [SE] Sweden ................... 9102528

[51] Int. Cl.⁶ ..................................... F27B 9/00
[52] U.S. Cl. ........................................ 432/159; 432/161
[58] Field of Search ................ 126/343.5 R, 343.5 A; 432/159, 161, 173, 202

[56] References Cited

U.S. PATENT DOCUMENTS

| | | | |
|---|---|---|---|
| 4,307,705 | 12/1981 | Douglas | 126/343.5 A |
| 4,416,326 | 11/1983 | Van Vlaendeieu | 126/343.5 A |
| 4,505,669 | 3/1985 | Rogers | 126/343.5 A |

FOREIGN PATENT DOCUMENTS

| | | |
|---|---|---|
| 3448188 | 12/1988 | Germany . |
| 3401959 | 1/1989 | Germany . |
| 2213096 | 8/1989 | United Kingdom . |

*Primary Examiner*—Raymond A. Nelli
*Attorney, Agent, or Firm*—Lerner, David, Littenberg, Krumholz & Mentlik

[57] ABSTRACT

Hot gas heating devices are disclosed for heating an end of a tubular body before it is heat sealed, including a nozzle casing having a nozzle cavity, a heating nozzle disposed within the nozzle cavity, whereby the heating nozzle can be mounted at a predetermined location within the end of the tubular body, the heating nozzle including a hot gas outlet for directing a hot gas in order that a predetermined region of the end of the tubular body can be heated, a hot gas exhaust for exhausting the hot gas from the end portion of the tubular body, the hot gas exhaust including an ejector for creating a substantially uniform pressure drop at the predetermined region of the end of the tubular body in order to create a uniform distribution of the hot gas on the predetermined region of the end of the tubular body, and a cooling and centering body disposed on the exterior of the end of the tubular body for cooling and centering the outer surface of the tubular body.

20 Claims, 3 Drawing Sheets

5,577,907

HOT GAS HEATING DEVICE

This is a continuation of application Ser. No. 08/204,177, filed as PCT/SE92/00598, Jan. 9, 1992 published as WO93/04844, Mar. 18, 1993, now abandoned.

TECHNICAL FIELD

The present invention relates to a hot gas heating device for heating an open end of a tubular body prior to the end region being heat sealed.

BACKGROUND OF THE INVENTION

A hot gas heating device is described in DE-C-3 401 959 for heating the upper region of a plastic or laminate tube which is already closed at one end and filled with the product which it is to contain. The material of the upper inner wall region of the tube is heated to a temperature at which it becomes soft by means of hot gas exiting a heating nozzle placed within the upper wall region of the tube. To securely locate the tube during the heating phase, a centering sleeve having cooling means is provided in abutment with the outer upper region of the tube adjacent the heating nozzle. From the inner upper wall region which is to be the weld site, the hot gas flows into a collector housing from whence it is exhausted along a conduit. After the heating operation, the tube is transferred to a press station where the heated end region of the open tube is sealably closed by means of press jaws.

Whilst the above-described type of device has proved to be a popular alternative to conventional high frequency welding, contact heat jaw welding and radiation heat welding, it has until now not been possible to seal a tube in such a way that the exterior weld site is not visibly damaged by temperature fluctuations around the weld region. So as not to highlight the impaired finish of this region, preprinted tubes are used whose upper end region is kept free from print. Marketing forces have, however, created a need for a device which can successfully seal a tubular container without affecting the outer upper wall region of the tube in an unaesthetic manner, thereby allowing complete print coverage of the entire exterior surface of the tube.

SUMMARY OF THE INVENTION

It is therefore an object of the present invention to provide a device for heating the inner upper wall region of a tube in a controlled manner so as to obtain a more even temperature distribution in the heated region.

This object is achieved according to the present invention by means of a hot gas heating device for heating an upper open end region of a tubular body prior to the end region being heat-sealed, said tubular body being substantially symmetrical about a longitudinal axis, said device comprising a nozzle housing including a casing accommodating a heating nozzle in a cavity in the casing, which nozzle can adopt a predetermined position within the tubular body so that a hot gas outlet extending circumferentially around said nozzle can deliver hot gas to an upper inner wall region of said tubular body, said nozzle housing further comprising a cooling and centering ring surrounding an outer side of said upper inner wall region of the tubular body, the heating device also being provided with means for exhausting the applied hot gas, wherein said means are arranged so as to control the applied hot gas flow by creating a substantially uniform pressure drop around the upper wall region of the tubular body, thereby creating a uniform distribution of the hot gas on the inner wall region of the tubular body.

By creating a substantially uniform pressure drop radially around the end region of the tube, the applied hot gas flow can be more accurately controlled, thereby leading to a uniform distribution of the hot gas on the upper inner wall region of the tube.

Since, with the device according to the present invention, there is a very much more uniform temperature distribution at the intended weld site, any unsightly blemishes caused by "hot spots" or "chilled" areas are eliminated, therefore permitting the use of tubes with complete exterior surface print coverage.

BRIEF DESCRIPTION OF THE DRAWINGS

The present invention will be described in more detail in the following with reference to the attached drawings, in which.

DETAILED DESCRIPTION OF PREFERRED EMBODIMENTS

Figure 1:
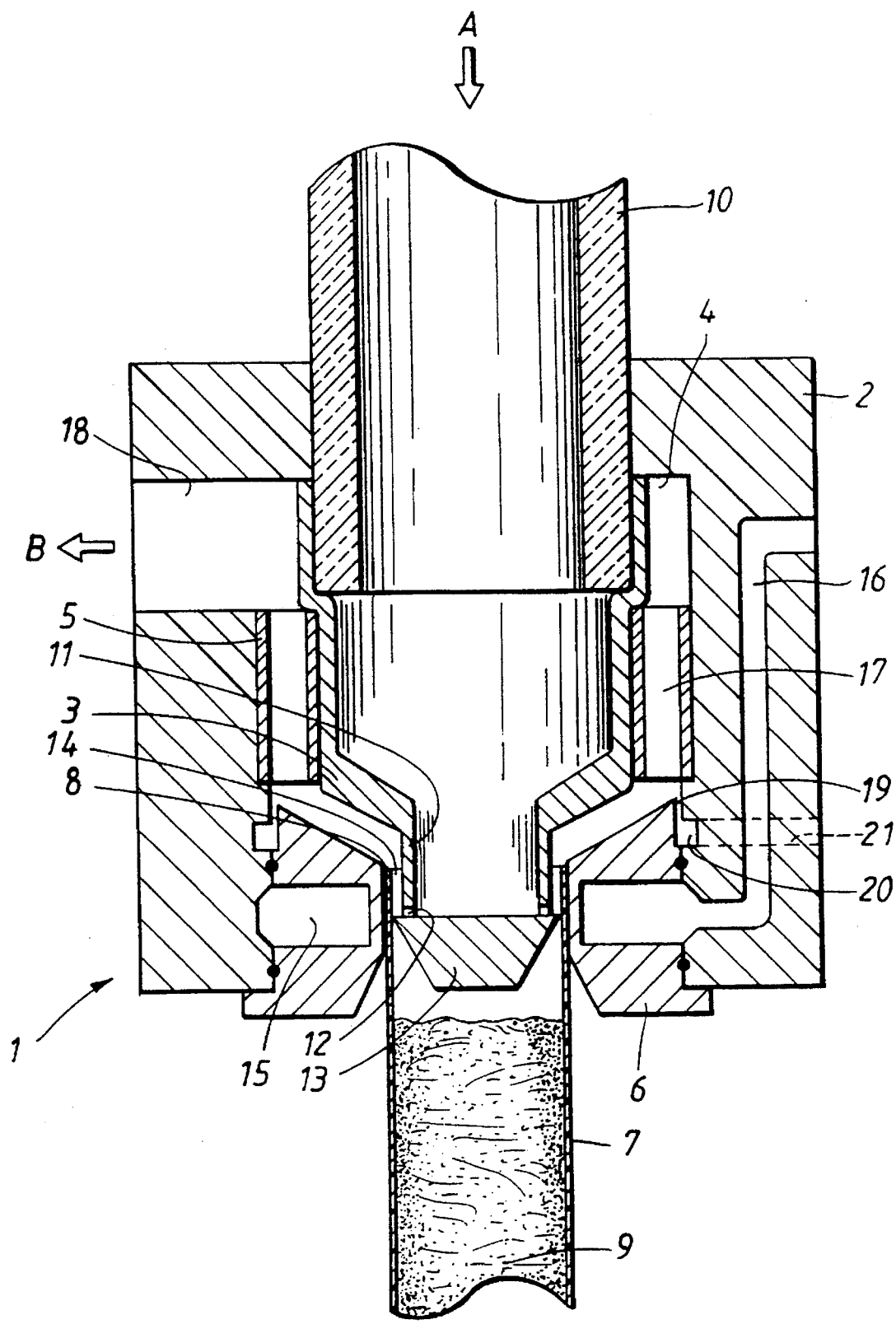
FIG. 1 is a schematic sectional view through a hot gas heating device according to a first embodiment of the present invention.

In FIG. 1, reference numeral 1 denotes a nozzle housing forming a part of one embodiment of the hot gas heating device according to the present invention. The nozzle housing is delimited by a casing 2 which is normally fabricated from several machined parts, though which has been shown in the drawings as a unitary construction for the sake of clarity. The casing is in the form of a sleeve, with an internal cavity 4 which accommodates a heating nozzle 3. The radial position of the heating nozzle is determined by a nozzle centering sleeve 5 which is carried by the casing 2. At the lower end of the casing 2, as shown in the drawings, there is arranged a cooling and centering ring 6, the purpose of which being to maintain a region of the outer wall of a tube 7 at a desired position and temperature.

The tube 7, which is to be heated in preparation for sealing, is filled via its open end 8 to a certain predetermined level by a product 9 in a not shown stage. The open tube end 8 and the heating nozzle 3 are brought to their relative position in FIG. 1 by way of not shown means for carrying out relative displacement between the tube 7 and the nozzle housing 1.

Hot gas, depicted by the letter A, is supplied to the heating nozzle 3 via a supply conduit 10 which enters the nozzle housing 1 via the upper open end of the casing 2 and communicates with the heating nozzle 3 in the cavity 4.

The heating nozzle 3 comprises a lower generally cylindrical end 11 having a circumferential outlet 12 for the hot air from the supply conduit 10. The outlet 12 may be in the form of one or more circumferentially extending slots or a plurality of holes placed circumferentially around the heating nozzle's cylindrical end 11. The outlet 12 is so shaped that hot gas is directed to a precise region of the upper inner surface of the tube wall. The dimensions of the cylindrical end 11 and the tube 7 are chosen so that a narrow circumferential slot 14 is formed between them, thereby allowing the hot gas to flow over this precisely defined region of the upper inner surface of the tube wall. Meanwhile, hot gas is hindered from propagating towards the product 9 in the tube 7 by means of a heat shield in the form of a flange 13 on the cylindrical end 11 of the heating nozzle 3.

To keep the size of the circumferential slot 14 as constant as possible, the outer upper end region of the tube 7 abuts the cooling and centering ring 6. As this term implies, cooling means are provided in the ring 6, preferably in the form of a circumferentially extending passage 15 in communication with at least one supply conduit 16 for a cooling medium such as water, air, etc. The cooling means provides for a well controlled environment at the external side of the heating region.

The hot gas, having heated the upper inner wall region of the tube, exits the circumferential slot 14 and flows through the lower region of the cavity 4 via through bores 17 in the nozzle centering ring 5 to the upper region of the cavity from whence it is exhausted in the direction of arrow B via an exhaust passage 18 in the casing of the nozzle housing 1.

The above-described arrangement corresponds by and large with that described in DE-C-3 401 959. In accordance with the present invention, however, the hot gas sealing device is provided with additional means for controlling the hot gas flow so as to create a uniform distribution of the hot gas on the inner upper wall of the tube. This is achieved according to the present invention by providing means for creating a substantially uniform pressure drop radially around the end of the tube. In the embodiments shown in the drawings, this means is in the form of a so-called gas ejector arrangement.

Figure 2:
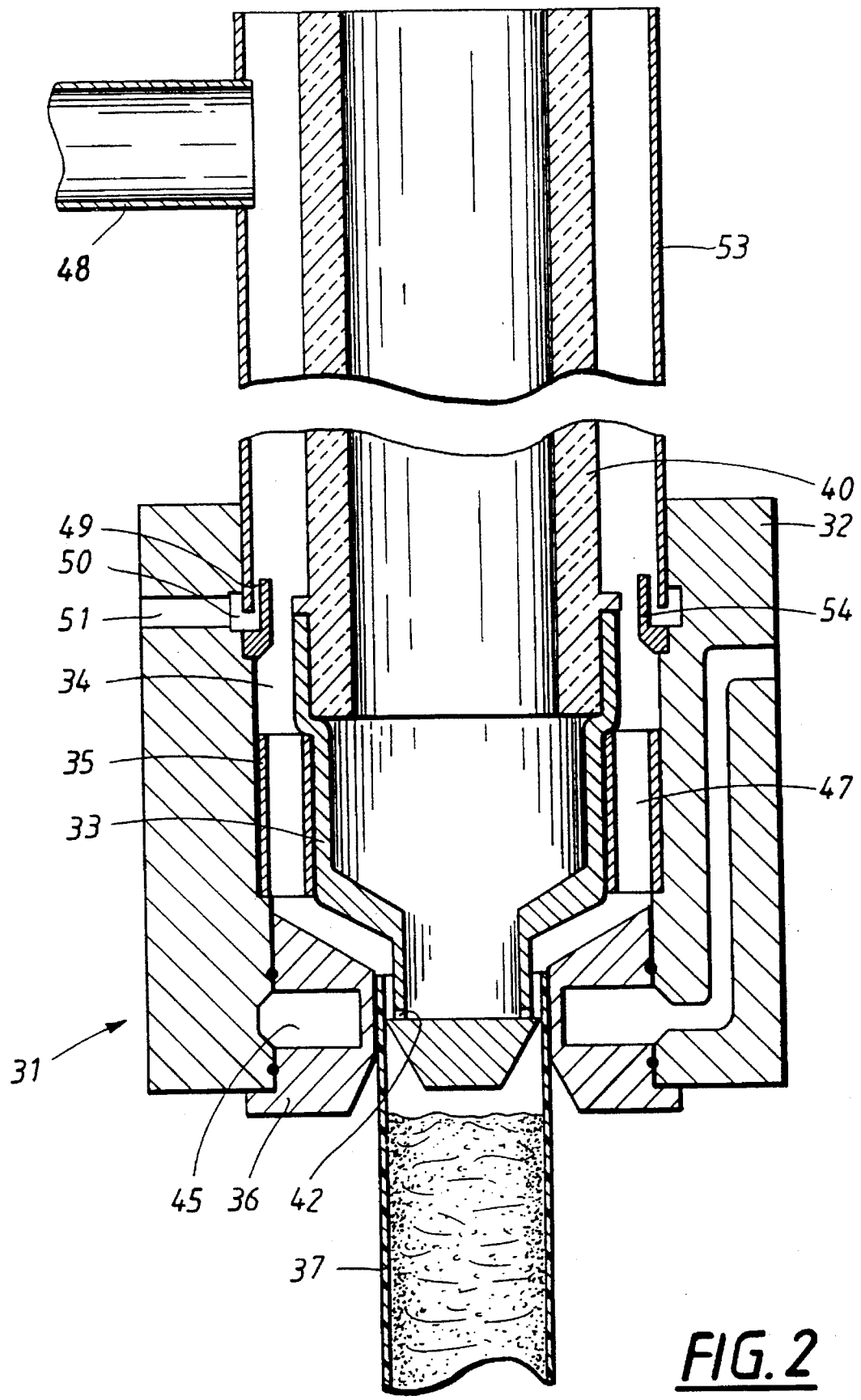
FIG. 2 is a schematic sectional view through a hot gas heating device according to a second embodiment of the present invention.

In the embodiments according to FIGS. 1 and 2, the gas ejector arrangement is located within the nozzle housing 1. The gas ejector arrangement in the embodiment shown in FIG. 1 comprises a narrow, upwardly directed, circumferentially extending slot 19 communicating with a circumferentially extending groove 20 in the inner wall of the casing 2 at a location above the hot gas outlet 12 in the heating nozzle 3. The slot 19 is formed between the upper outer surface of the cooling and centering ring 6 and the inner surface of the casing 2 by, for example, machining down the outer diameter of the ring 6 over this region. The groove 20 serves as a manifold for the gas which is to be ejected through the slot 19 and which is supplied to the groove 20 by means of at least one passage 21 in the casing 2. The slot 19 and the groove 20 are so dimensioned that the ejected gas exits the slot 19 into the lower region of the cavity 4 at substantially uniform pressure at every point on the slot 19. The velocity of the ejected gas creates a venturi effect in the lower region of the cavity, thereby bringing about a relative pressure drop radially around the end of the tube 7. Since the ejected gas exits the slot 19 at substantially uniform pressure, it follows that the pressure drop around the container end will also be substantially uniform. Due to this pressure uniformity, a much more even distribution of the hot gas over the upper inner wall region of the tube 7 is obtained. This ensures that unacceptable temperature fluctuations in the heated wall region are avoided.

With reference to FIG. 2, reference numeral 31 denotes a nozzle housing comprising a casing 32, a heating nozzle 3 situated in a cavity 34, a nozzle centering sleeve 35 and a cooling and centering ring 36 for a tube 37, the cooling and centering ring being provided with a circumferentially extending passage 45 for a cooling medium.

The device according to FIG. 2 principally differs from that shown in FIG. 1 in that the means for creating a substantially uniform pressure drop radially around the end of the tube 37 is located higher up in the nozzle housing 31. More specifically, this means is located above a nozzle centering sleeve 35 which determines the radial position of the heating nozzle 33. Although shown in the drawing as a sleeve, it is to be understood that an extension of the casing 32 into the cavity 34 therein could serve the same purpose as the sleeve 35. The sleeve 35 is provided with a plurality of through bores 47 to allow the hot gas which has been applied to the upper inner surface of the tube 37 to flow up to a hot gas evacuation tube 53 at the upper region of the casing 32. The hot gas evacuation tube is concentric with both the longitudinal axis of the heating nozzle 33 and a hot gas supply conduit 40 through which hot gas is supplied to the heating nozzle. The hot gas evacuation tube 53 hereby delimits an annular, longitudinally extending continuation of the cavity 34 within the casing 32. The lower end of the hot gas evacuation tube 53 extends into the casing 32 and terminates at a predetermined distance above the nozzle centering sleeve 35. In this position, a lower end portion of the evacuation tube 53 partially covers a groove 50 formed in the inner wall of the casing 32. This groove 50 forms the manifold of a gas ejector arrangement and is supplied with gas via one or more supply conduits 51 passing radially through the casing wall. In the embodiment shown in FIG. 2, the annular gap 49 of the ejector arrangement is delimited on one side by the hot gas evacuation tube 53 and on the other side by the upper outer surface of a circumferentially extending ejector ring 54.

In operation, the annular ejector gas manifold 50 is supplied with gas via the supply conduit 51. This gas is ejected upwardly into the annular space delimited by the hot gas supply conduit 40 and the evacuation tube 53 through the circumferentially extending slot 49. The slot 49 and the manifold 50 are so dimensioned that the ejected gas exits the slot at substantially uniform pressure at every point on the slot. The velocity of the ejected gas creates a venturi effect in the lower region of the cavity 34, thereby bringing about a relative pressure drop radially around the end of the tube 37. As mentioned above in connection with the embodiment shown in FIG. 1, since the ejected gas exits the slot 49 at substantially uniform pressure, it follows that the pressure drop around the container end will also be substantially uniform. Due to this pressure uniformity, a much more even distribution of the hot gas over the upper inner wall region of the tube 37 is obtained.

The applied hot gas together with the ejected gas are exhausted via an exhaust passage 48 located higher up along the evacuation tube 53.

Figure 3:
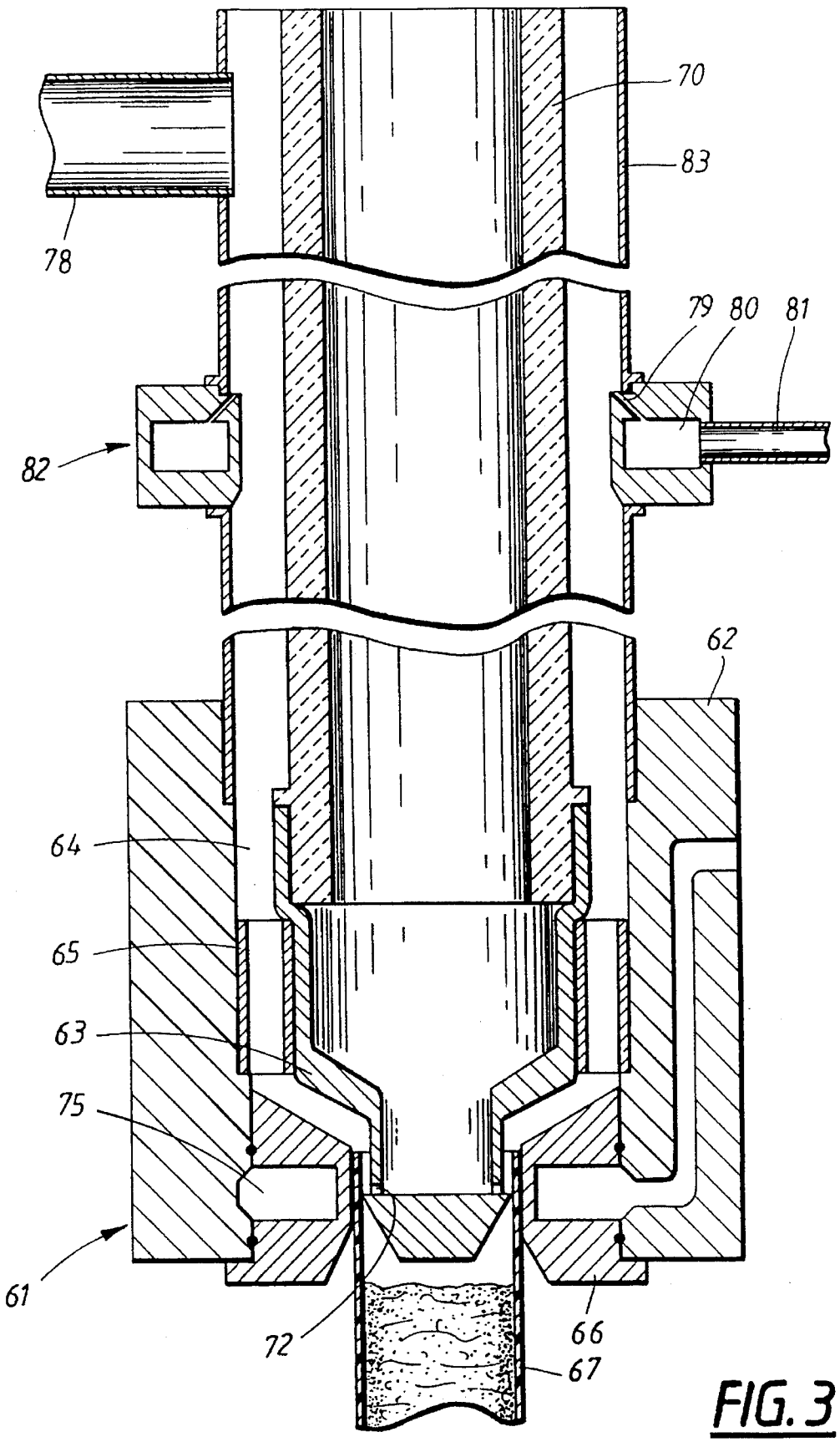
FIG. 3 is a schematic sectional view through a hot gas heating device according to a third embodiment of the present invention.

A further embodiment of the hot gas heating arrangement according to the present invention is shown in FIG. 3. Accordingly, reference numeral 61 denotes a nozzle housing comprising a casing 62, a heating nozzle 63 situated in a cavity 64, a nozzle centering sleeve 65 and a cooling and centering ring 66 for a tube 67. Again, the cooling and centering ring may be provided with a circumferentially extending passage 75 for a cooling medium.

The device according to FIG. 3 principally differs from that shown in FIG. 1 or FIG. 2 in that the means for creating a substantially uniform pressure drop radially around the end of the tube 37 is located exteriorally of the nozzle housing 61 in the form of an ejector arrangement 82 placed radially around and within a hot gas evacuation tube 83 surrounding the hot gas supply conduit 70 to the heating nozzle 63. As previously described with reference to FIG. 2, the hot gas evacuation tube 83 extends from within the casing 62 of the nozzle housing 61 and communicates with the cavity 64 therein. The hot gas evacuation tube is concentric with the longitudinal axis of the heating nozzle and thereby delimits an annular, longitudinally extending continuation of the cavity 64.

The ejector arrangement 82 comprises a ring-shaped housing incorporating an annular ejector gas manifold 80, supplied with the gas which is to be ejected via one or more supply conduits 81. This gas is ejected upwardly into the space between the hot gas supply conduit 70 and the evacuation tube 83 through a circumferentially extending slot 79. The slot 79 and the manifold 80 are, as in the previously described embodiments, so dimensioned that the ejected gas exits the slot 79 at substantially uniform pressure at every point on the slot 79. The velocity of the ejected gas creates a venturi effect in the lower region of the evacuation tube 83 and the cavity 64, thereby bringing about a relative pressure drop radially around the end of the tube 67. Again, since the ejected gas exits the slot 79 at substantially uniform pressure, it follows that the pressure drop around the container end will also be substantially uniform. Due to this pressure uniformity, a much more even distribution of the hot gas over the upper inner wall region of the tube 67 is obtained.

As in the embodiment according to FIG. 2, the applied hot gas together with the ejected gas are exhausted via an exhaust passage 78 located higher up along the evacuation tube 83.

Naturally, the present invention is not restricted to the embodiments shown in the drawings and described above, but may be varied within the scope of the following claims. For example, the ejector gas slot 19, 49,79 may be in the form of a plurality of holes. Furthermore, more than one slot can be provided, with an axial separation between the slots. In addition, more than one ejector arrangement can be provided, again with axial separation.

I claim:

1. Apparatus for heating an end portion of a tubular body having a longitudinal axis comprising a nozzle casing having a longitudinal axis and including a nozzle cavity, a heating nozzle disposed within said nozzle cavity, whereby said heating nozzle can be mounted at a predetermined location within said end portion of said tubular body, said heating nozzle including hot gas outlet means for directing a hot gas to a predetermined region of said upper end portion of said tubular body, hot gas exhaust means for exhausting said hot gas from said end portion of said tubular body, said hot gas exhaust means including pressure drop means for creating a substantially uniform pressure drop at said predetermined region of said end portion of said tubular body so as to create a uniform distribution of said hot gas on said predetermined region of said end portion of said tubular body, said pressure drop means comprising ejector means located downstream of said upper portion of said tubular body in the direction of flow of said hot gas and extending circumferentially around said longitudinal axis of said nozzle casing, said longitudinal axis of said nozzle casing being coaxial with said longitudinal axis of said tubular body, and cooling and centering means disposed exteriorly of said end portion of said tubular body for cooling and centering the outer surface of said end portion of said tubular body.

2. The apparatus of claim 1 wherein said cooling and centering means comprises a centering ring in direct contact with said outer surface of said end portion of said tubular body.

3. The apparatus of claim 1 wherein said ejector means comprises gas ejector means for ejecting a gas comprising a circumferential slot for said gas, manifold means for supplying said gas to said circumferential slot, and supply conduit means for supplying said gas to said manifold means.

4. The apparatus of claim 3 wherein said gas ejector means is disposed in said nozzle casing.

5. The apparatus of claim 4 wherein said circumferential slot is disposed between said cooling and centering means and a wall of said nozzle casing defining a portion of said nozzle cavity.

6. The apparatus of claim 5 wherein said nozzle casing includes an exhaust passage for withdrawing said hot gas from said nozzle casing, said exhaust passage being connected to said hot gas exhaust means, and extending substantially radially from said nozzle cavity.

7. The apparatus of claim 4 including heating nozzle centering means for supporting and centering said heating nozzle within said nozzle cavity.

8. The apparatus of claim 7 within said heating nozzle centering means includes a longitudinally extending passage for permitting said hot gas to pass therealong, said gas ejector means being disposed downstream of said heating nozzle centering means.

9. The apparatus of claim 8 including a hot gas evacuation tube extending from said nozzle casing and in communication with said heating nozzle centering means.

10. The apparatus of claim 9 including a circumferentially extending ejector ring, said circumferential slot being disposed between said circumferentially extending ejector ring and the inner surface of said hot gas evacuation tube.

11. The apparatus of claim 3 wherein said gas ejector means is disposed exterior to said nozzle casing.

12. The apparatus of claim 11 including a hot gas evacuation tube extending from said nozzle casing and in communication with said hot gas exhaust means, wherein said gas ejector means is disposed on said hot gas evacuation tube.

13. The apparatus of claim 12 including a hot gas supply duct for supplying said hot gas to said heating nozzle, said hot gas evacuation tube being disposed concentrically with said hot gas supply duct.

14. The apparatus of claim 13 wherein said hot gas supply duct supplies said hot gas to said heating nozzle in a direction along an extension of said longitudinal axis of said tubular body, whereby said hot gas evacuation tube defines an annular longitudinally extending continuation of said nozzle cavity.

15. The apparatus of claim 13 wherein said hot gas evacuation tube includes an exhaust passage at a location remote from said nozzle casing.

16. Apparatus for heating an end portion of a tubular body having a longitudinal axis comprising a nozzle casing including a nozzle cavity, a heating nozzle disposed within said nozzle cavity, whereby said heating nozzle can be mounted at a predetermined location within said end portion of said tubular body, said heating nozzle including hot gas outlet means for directing a hot gas to a predetermined region of said upper end portion of said tubular body, hot gas exhaust means for exhausting said hot gas from said end portion of said tubular body, said hot gas exhaust means including pressure drop means for creating a substantially uniform pressure drop at said predetermined region of said end portion of said tubular body so as to create a uniform distribution of said hot gas on said predetermined region of said end portion of said tubular body, and cooling and centering means disposed exteriorly of and in direct contact with said end portion of said tubular body for cooling and centering the outer surface of said end portion of said tubular body.

17. The apparatus of claim 16 wherein said nozzle casing has a longitudinal axis, said pressure drop means comprising ejector means extending circumferentially around said longitudinal axis of said nozzle casing, said longitudinal axis of said nozzle casing being coaxial with said longitudinal axis of said tubular body.

18. The apparatus of claim 17 wherein said ejector means comprises gas ejector means for ejecting a gas comprising a circumferential slot for said gas, manifold means for supplying said gas to said circumferential slot, and supply conduit means for supplying said gas to said manifold means.

19. The apparatus of claim 18 wherein said gas ejector means is disposed in said nozzle casing.

20. The apparatus of claim 19 wherein said circumferential slot is disposed between said cooling and centering means and a wall of said nozzle casing defining a portion of said nozzle cavity.

* * * * *